United States Patent [19]

Cooper

[11] 4,215,966

[45] Aug. 5, 1980

[54] MATERIAL HANDLING APPARATUS

[75] Inventor: Kenneth R. Cooper, Don Mills, Canada

[73] Assignee: Canada Square Management Ltd., Toronto, Canada

[21] Appl. No.: 905,823

[22] Filed: May 15, 1978

[51] Int. Cl.² .............................................. B65G 3/04
[52] U.S. Cl. ................................. 414/173; 198/773; 414/267
[58] Field of Search ............... 414/176, 267, 268, 325, 414/512, 173; 198/347, 474, 773, 777, 360

[56] References Cited

U.S. PATENT DOCUMENTS

| | | | |
|---|---|---|---|
| 3,366,219 | 1/1968 | Schickle | 198/474 X |
| 4,142,622 | 3/1979 | Seragnoli | 198/347 |

Primary Examiner—Robert G. Sheridan
Attorney, Agent, or Firm—Rogers, Bereskin & Parr

[57] ABSTRACT

A material handling apparatus is described, for example, for delivering bags of garbage to an incinerator. The apparatus includes a series of bins for receiving waste material, each bin having an open upper end through which material can be introduced into the bin, and each bin including means operable to appropriate times to eject material upwardly out of the open upper end of the bin. The bins are disposed in a cascade arrangement so that material can be progressively conveyed through the apparatus to a discharge location by appropriately operating the material ejecting means of the respective bins.

8 Claims, 9 Drawing Figures

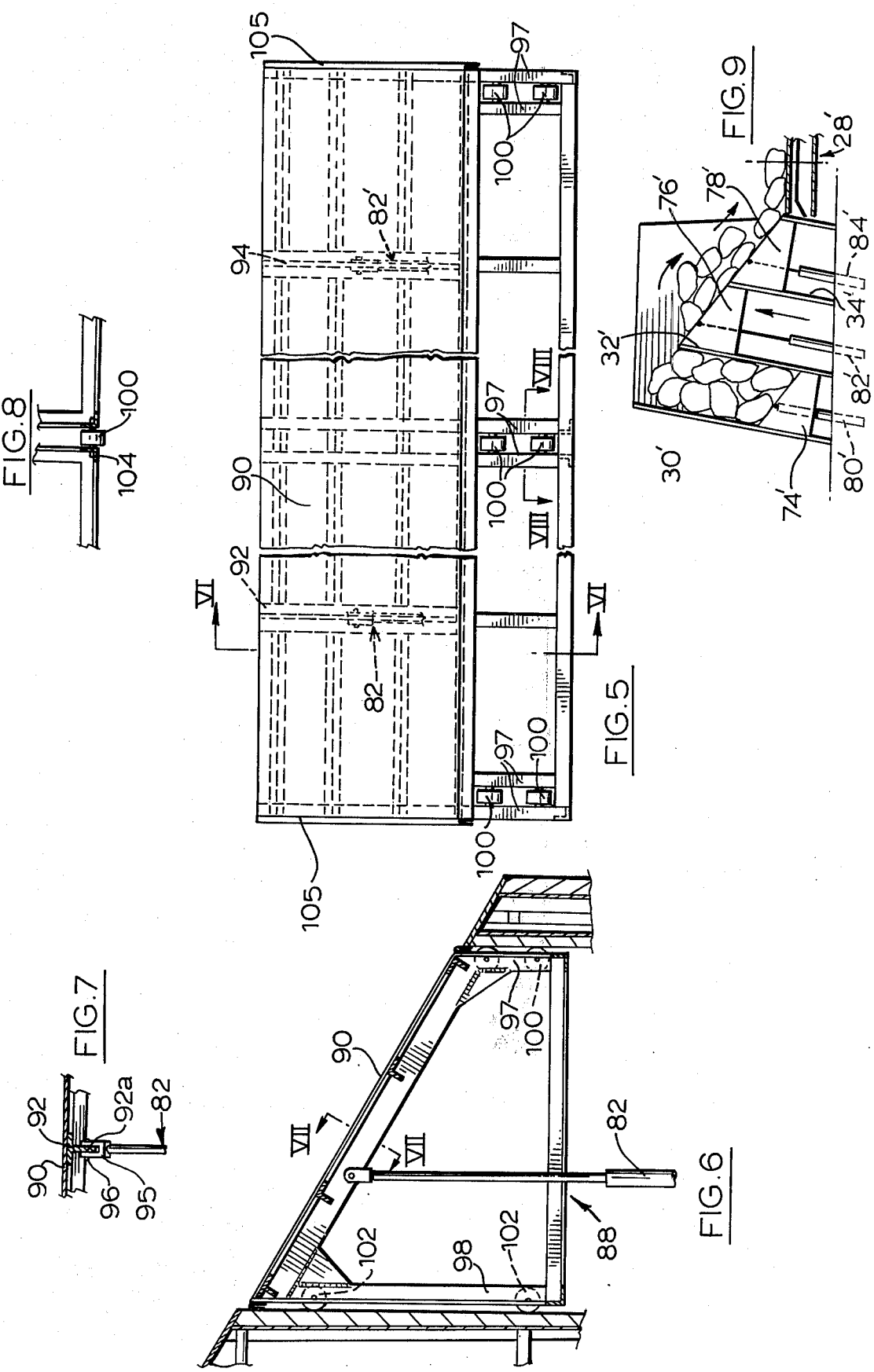

MATERIAL HANDLING APPARATUS

This invention relates to a material handling apparatus. In particular, the invention has been devised in connection with the handling of combustible waste material such as bags of garbage and the like intended to be delivered to an incinerator for fuel. However, the invention is not limited to this particular application.

It has previously been proposed to use garbage as a fuel source for heating and/or cooling buildings in which large amounts of combustible waste material are ordinarily available, such as office buildings, hospitals and the like. By way of example, our Canadian patent application No. 284,929 filed Aug. 18, 1977 is concerned with a heating and cooling system for a building which includes an incinerator intended to be fueled by combustible waste material from the building.

While the desirability of conserving energy by using garbage as a fuel source is widely acknowledged, problems have been encountered in providing means for efficiently handling garbage to be delivered to an incinerator. One example of a prior art garbage handling installation used in a hospital includes an open-topped hopper for receiving bags of garbage collected by hospital personnel. The hopper has an opening at its lower end controlled by a gate arrangement intended to allow garbage to be periodically removed from the hopper. A conveyor belt is disposed below the hopper for delivering the garbage to an incinerator. In practice, it is found that the hopper often becomes jammed with bags of garbage to the extent that the garbage bags will not pass through the outlet opening of the hopper when the gate arrangement is opened. In fact, practical tests have shown that the garbage bags become so tightly jammed in the hopper that they often cannot be dislodged even by forcing a knife or other tool downwardly through the garbage bags or by attempting to pull the bags down from below.

An object of the present invention is to provide an improved material handling apparatus intended to avoid this problem.

According to the invention, the apparatus includes a series of bins for receiving waste material, each bin having an open upper end through which material can be introduced into the bin, and each bin including means operable at appropriate times to eject material upwardly out of the open upper end of the bin. The bins are disposed in a cascade arrangement so that material can be progressively conveyed through the apparatus to a discharge location by appropriately operating the material ejecting means of the respective bins.

In order that the invention may be more clearly understood, reference will now be made to the accompanying drawings which illustrate a number of embodiments of the invention by way of example, and in which:

FIG. 5 is a front view of part of the apparatus shown in FIGS. 2, 3 and 4;

FIG. 6 is a vertical sectional view on line VI—VI of FIG. 5;

FIG. 7 is a detail sectional view on line VII—VII of FIG. 6;

FIG. 8 is a detail sectional view on line VIII—VIII of FIG. 5; and,

FIG. 9 is a view similar to FIG. 4 illustrating an alternative embodiment of the invention.

Figure 1:
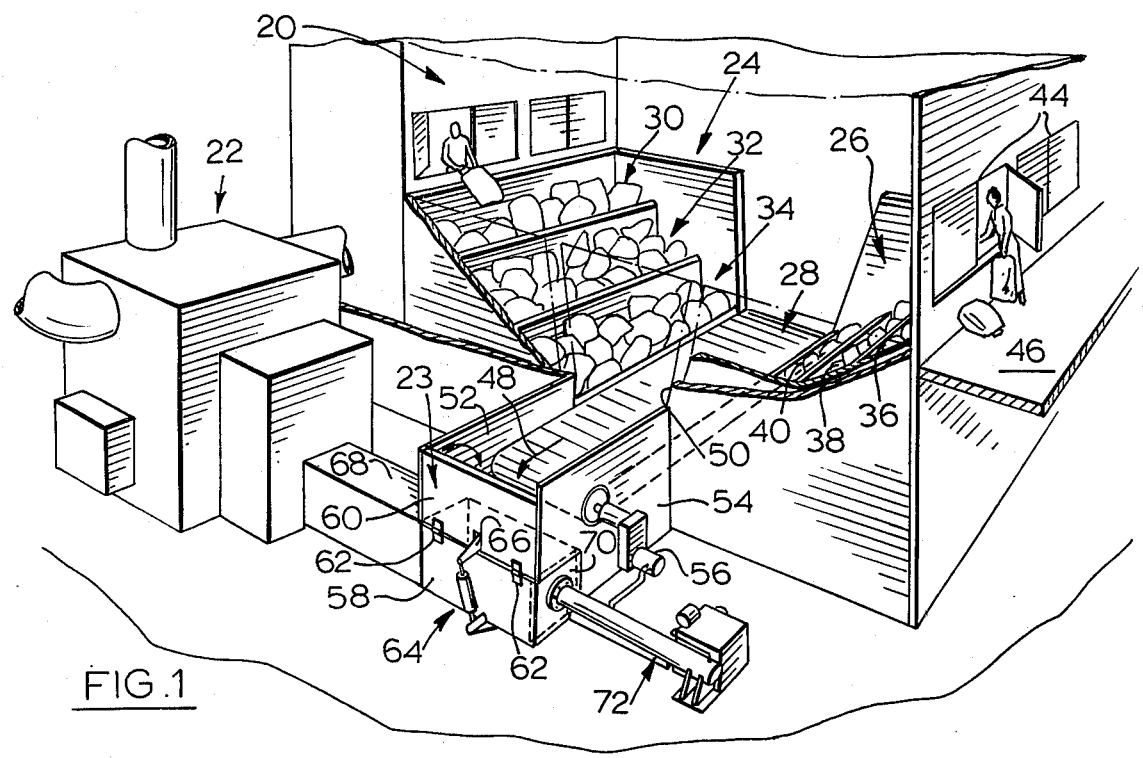
FIG. 1 is a perspective view of a material handling apparatus according to the invention in association with an incinerator.

Referring first to FIG. 1, the material handling apparatus is generally indicated at 20 and is intended for handling bags of garbage to be fed to an incinerator 22. The incinerator is of conventional form and will not therefore be described in detail. For present purposes, it is sufficient to note that the incinerator includes a device 23 for feeding garbage bags into it. Device 23 will be described more specifically later. In this embodiment, the installation comprising apparatus 20 and incinerator 22 is intended to be used in an office building for handling and burning bags of garbage produced in the building and incinerator 22 is used as a heating source for the building's heating system (not shown).

Apparatus 20 includes two series of bins generally denoted 24 and 26 arranged in banks on opposite sides of a belt conveyor 28. In this embodiment, each series includes three bins; the bins in series 24 are denoted respectively 30, 32 and 34 and the bins in series 26 are denoted 36, 38 and 40. The bins have open tops and are housed in a suitable room in the building which allows the garbage bags to be readily loaded into the bins from above. In the illustrated embodiment, parts of the walls of the room are visible, and it will be seen that openings 42 and 44 are provided in the walls above the bins for this purpose. Walkways, one of which is denoted 46 are provided on the outside of the walls to provide access for service personnel. In some cases, it may also be desirable to provide walkways along the ends of the apparatus to facilitate loading of garbage bags, although such walkways are not provided in the present embodiment.

As noted previously, a conventional belt conveyor 28 is provided between the two banks of bins. Conveyor 28 is intended to receive garbage bags ejected from the bins as will be described and to convey the bags in the direction of arrow 48 to the incinerator feeding device 23. Thus, it will be seen that the conveyor passes through an opening 50 in an end wall of the room in which the bins are housed and that the outer end of the conveyor is supported between side plates 52 and 54 at the outer side of the wall. A suitable motor drive for the conveyor is indicated at 56.

The incinerator feeding device 23 includes an elongate rectangular box 58 which is disposed in a transverse position between the two side plates 52 and 54 supporting the outer end of the conveyor. Box 58 has a lid 60 which is connected to a side of the box by hinges 62 so that the lid can be moved from the closed horizontal position in which it is shown to an open vertical position, in which material discharged from the conveyor 28 falls into the open box. The lid is moved between its open and closed position by a hydraulic cylinder and ram device 64, the lower end of which is mounted on the box, and the upper end of which is connected by a link 66 to the lid 60. Accordingly, if the ram of device 64 is retracted from the position in which it is shown in FIG. 1, lid 60 will be raised. Similarly, by extending the ram, the lid can be closed.

Box 58 is open at both ends. The end which is disposed at the left in FIG. 1 communicates with an extension 68 of box 58 which leads to the inlet door (not shown) of the incinerator. The other end of box 58 is closed by a square plate carried by a further cylinder and ram device 72 arranged with its axis horizontal and in alignment with the horizontal axis of box 58. Accordingly, by extending the ram of device 72, plate 70 slides longitudinally through box 58 to push any material in the box towards the incinerator.

In practice, the sequence of operation of this part of the apparatus will be as follows. With the lid 60 of box 58 in an open position, conveyor 28 will deliver garbage into the open box. When the box is full, the supply of garbage will be terminated and lid 60 will be closed. The ram of device 72 will then be extended to push the garbage towards the incinerator. With the incinerator inlet door open, the garbage will then be pushed directly into the incinerator. When the apparatus is being started up, it will of course be necessary for the box extension 68 to become substantially filled with garbage before garbage will actually pass into the incinerator. In other words, the first few charges of garbage will serve to fill extension 68.

Although not shown in the drawings it is anticipated that, in practice, the operation of feeding the incinerator 20 will proceed automatically. Thus, a photocell arrangement will detect when box 58 is full and will generate a signal to stop conveyor 28 and initiate a sequence control for appropriately operating the rams 64 and 72.

Figures 2, 3, 4:
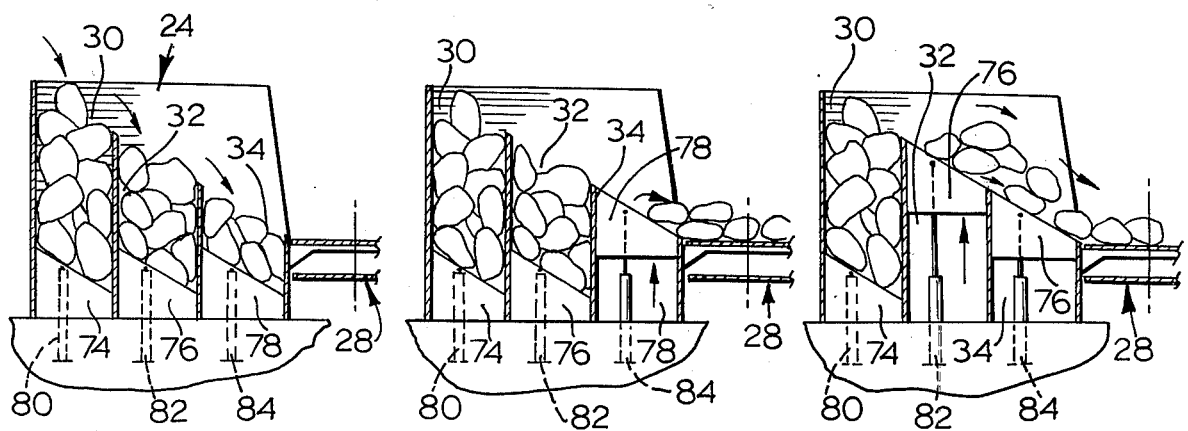
FIGS. 2, 3 and 4 are diagrammatic side views of part of the apparatus of FIG. 1 illustrating its sequence of operation.

Reference will now be made to FIGS. 2, 3 and 4 which show the three bins 30, 32 and 34 of series 24 and which will now be described in explaining the principle of operation of the apparatus. Each bin is of rectangular shape in plain view and has an open upper end and front, rear and side walls having flat, smooth inner surfaces which define an internal space of constant rectangular cross-section throughout its height. Slidably mounted between the side walls of each bin is a platform which defines the bottom wall of the bin. In the case of bins 30, 32 and 34, the platforms are denoted respectively 74, 76 and 78. Associated with each platform as will be described is a hydraulic cylinder and ram device arranged to cause vertical sliding movement of the platform within the internal space of the bin. The cylinder and ram devices of the three bins are denoted respectively 80, 82 and 84. Thus, it will be appreciated that, by extending a cylinder and ram device associated with the platform of any particular bin, garbage bags in that bin can be ejected from the bin.

The bins in each series are disposed in a cascade arrangement so that garbage bags ejected from an upper bin in the series can be progressively conveyed to a discharge location. In the illustrated embodiment, the discharge location is represented by the conveyor 28. Thus, it will be seen that the three bins in series 24 are arranged directly adjacent one another and that the front wall of each bin is lower than the rear end wall of that bin. This shaping ensures that garbage ejected from an upper bin in the series will always spill over the front wall of that bin and that garbage ejected from the lowest bin in the series will fall onto conveyor 28. The side walls of the bins extend upwardly somewhat to prevent material spilling out of the bins at the sides. Each of the platforms 74, 76 and 78 in the bins has an upper surface which slopes downwardly generally from the rear wall of the associated bin to front wall. In this embodiment, the upper surfaces of the platforms slope to an angle of approximately 30° to the horizontal. The platforms are arranged so that, in their uppermost positions, they co-operate to define a generally flat inclined surface disposed at an angle of approximately 30° to the horizontal.

FIGS. 2 and 4 illustrate a sequence of operation of the platforms in the respective bins when the apparatus is in operation. The platforms are initially in their bottom positions in which they are shown in FIG. 2. Garbage is then loaded into the bins from above as indicated by the arrows 86 in FIG. 2. This operation will take place over a period of time as and when garbage becomes available. When all of the bins are full and the garbage is to be discharged into conveyor 28, the platform 78 of the lower bin 34 is raised as shown in FIG. 3. This causes the garbage bags formerly contained in bin 34 to spill over out of the open upper end of the bin onto conveyor 28. The conveyor is in motion at this time and will carry away the garbage bags as they fall onto the conveyor. When bin 34 is empty, platform 78 remains in its upper position and the platform 76 of bin 32 is raised so that the contents of that bin spill out as shown in FIG. 4. Platform 78 prevents the garbage spilling out of bin 32 from entering bin 34 so the garbage slides down the upper surface of platform 78 and onto conveyor 28. Platform 76 is then maintained in its upper position while the platform 74 of bin 30 is raised so that the garbage bags in bin 30 spill out and slide down the upper surfaces of platforms 76 and 78 and onto conveyor. All of the bins in series 24 are then empty and the platforms are returned to their lower positions so that the bins are again ready to receive garbage bags.

It will be appreciated that the operation of emptying the bins can proceed at any appropriate speed according to the rate of consumption of garbage by incinerator 20 and the rate at which garbage becomes available. Thus, the three platforms do not have to be raised immediately one after the other. Also, the platforms could be raised other than in the particular sequence described. If, for example, the platform 74 of bin 30 were raised first, the garbage from that bin would spill down over the garbage in the other two bins and onto the conveyor. However, this would result in a less controlled flow of garbage than with the sequence described. In other words, although the described sequence may be varied, that sequence is belived to be preferable from the point of view of controlling the flow of garbage onto the conveyor. In another embodiment, it might even be possible to raise all three platforms simultaneously.

It should also be noted that the platforms can be made to assist in loading garbage into the bins. For example, if garbage is initially loaded into the upper bin 30, the platform 74 of that bin could be raised to transfer the garbage into bin 32. Similarly, garbage could be transferred from bin 32 to bin 34 by raising the platform 76 of bin 32.

In any event, appropriate hydraulic control equipment will be provided for operating the cylinder and ram devices 80, 82 and 84 and may include automatic sequence control devices. On the other hand, in a simple case, the cylinder and ram devices may be controlled by simple manually operable on/off valves. Such control equipment will be readily constructed by a person skilled in the art and has not been illustrated since it forms no part of the invention.

The bins in series 26 are constructed and arranged to operate in essentially the same fashion as the bins in series 24. Accordingly, these bins will not be described in detail. It should merely be noted that, as a practical matter, it may be desirable to synchronize the emptying of the bins in the respective series so as not to overload conveyor 28.

It will be appreciated that FIGS. 2, 3 and 4 are diagrammatic views intended to illustrate the sequence of operation of the platforms. FIGS. 5 to 8 show practical details of the construction of the platform 76 of bin 32 as a typical example. The platforms in the other bins in both series 24 and series 26 are of essentially the same construction and will not therefore be described in detail. Platform 76 is made up of a welded framework 88 of angle iron and a metal plate 90 welded to the top of framework 88. Framework 88 is of truncated triangular shape in end view and of rectangular shape in plan view. As can best be seen in FIG. 5, the top of framework 88 is made up of a series of interconnected longitudinal and transverse members which define a gridform support for plate 90. Two of the transverse members are of T-shape in cross-section and are denoted 92 and 94 in FIG. 5. These members define attachment points for two hydraulic cylinder and ram devices 82 and $82^1$ by which the platform is raised and lowered. Thus, referring to FIG. 7, it will be seen that the ram of device 82 has a yoke 95 at its outer end which is connected by a pivot pin 96 to the stem portion 92a of member 92. A similar arrangement (not shown) is provided for cylinder and ram device $82^1$. In describing FIGS. 2 to 4, reference was made to a single cylinder and ram device for the sake of simplicity of description, and it will of course be appreciated that a single device could be used in practice. However, in the particular embodiment shown in detail in FIGS. 5 to 8, two cylinder and ram devices are used in view of the length of the platform in order to provide a balanced lifting action. The devices 82 and $82^1$ are in fact telescopic so that they can lift the associated platforms through a height greater than the length of the devices themselves.

The framework 88 of platform 76 includes vertical front and rear members 97 and 98 respectively as can best be seen in FIG. 6. These members are arranged in pairs at opposite sides of the framework and in the centre, and the members in each pair are spaced transversely of the framework as can be seen in FIG. 5 in the case of members 96. The rear vertical members 98 are similarly arranged although they are not visible in FIG. 5. The pairs of vertical members provide mounting points for front and rear rollers, the front ones of which are denoted 100 while the rear rollers are denoted 102. FIG. 8 shows a detail view of the mounting point of one of the front rollers 100. It will be seen that the roller is fixed to a shaft 104 which is mounted in freely rotatable fashion in the framework 88. The rollers protrude slightly from the members between which they are mounted and run on the front and rear walls of the bin in which the platform is vertically movable to locate the platform in the longitudinal direction. Rubber strips 105 of inverted U-shape (see FIG. 5) are attached to ends of plate 90 and slide on end walls (not shown) of the bin to provide lateral location and seal against ingress of garbage.

Referring again to FIG. 6, the walls of each bin are formed by vertical steel plates supported by an angle iron framework of welded construction. Parts of the plates forming the front and rear walls of bin 32 are visible at 106 and 108 respectively in FIG. 6. Also, part of the supporting framework for plate 106 is shown at 110. Since the form of this framework is not believed to be significant, it will not be described, except to note that the framework also supports a plate 112 which forms the rear wall of bin 34. A capping plate 114 is provided on top of the framework. The side walls of the bin are of similar form.

In FIG. 6, the platform 76 is shown in its top position in bin 32. It will be noted that the front (lower) edge of the platform denoted 76a protrudes slightly above the plate 114 on framework 110, while the rear (upper) edge of platform 76, denoted 76b, is located below the corresponding plate between bin 32 and bin 30. This position has been deliberately chosen to avoid presenting any obstruction to movement of garbage in practice. For example, if there is a slight inaccuracy or variation in the stroke of the cylinder and ram devices which raise the platform (eg. due to wear in use) the chosen position allows some tolerance for corresponding inaccuracies in the top position of the platform. Thus, the platform could be slightly higher or lower than the position in which it is shown in FIG. 6 without obstructing movement of garbage accross the top surface of the platform.

The preceding description of FIGS. 5 to 8 refers specifically to bin 32 and its platform 76. However, it is to be understood that the other bins and platforms in both series 24 and in series 26 are essentially the same.

Reference will now be made to FIG. 9 of the drawing which illustrates an alternative embodiment of the invention. FIG. 9 is a view similar to FIG. 4 and primed reference numerals have been used in FIG. 9 to denote parts which correspond with FIG. 4. The embodiment of FIG. 9 differs from the previous embodiment in that the bins, denoted 30', 32' and 34' are inclined slightly in the direction of intended movement of the garbage. The cylinder and ram devices 80', 82' and 84' are correspondingly inclined. Otherwise, the bins themselves and the platforms therein (74', 76' and 78') are essentially the same as in the previous embodiment.

It will be appreciated that, in the FIG. 9 embodiment, material is ejected from the bins 30', 32' and 34' in a direction which is inclined in the direction of intended movement of the material. Accordingly, as the material is ejected from the bins, it will tend to fall towards the discharge location adjacent bin 34'. This embodiment is designed to promote improved movement of garbage by avoiding any tendency for garbage raised on one of the platforms of the apparatus to simply remain in a stationary stack on that platform and not spill over into an adjacent bin or to said discharge location. This embodiment may be particularly suitable in handling certain types of garbage, eg. relatively heavy material which might tend to become consolidated in the bin. It will of course be appreciated that, while FIG. 9 shows only one series of bins, a second similar series may also be provided as in the previous embodiment and may, if appropriate, be inclined towards the bins 30', 32' and 34'.

It should be noted that the preceding description relates to specific embodiments of the invention, and that many modifications are possible within the broad scope of the invention.

For example, although the description refers to an apparatus which includes two series of bins, each series comprising three individual bins, there is no limitation to this particular arrangement. In a minimum case, the apparatus could comprise two bins in a cascade arrangement. On the other hand, the number of bins in each series could be increased to any reasonable number within the limitations of the space available. Similarly, the number of series in any given apparatus could be increased beyond the two series shown.

The term "cascade arrangement" as used in this application is intended to include any arrangement which allows material to be progressively conveyed through the apparatus in cascade fashion.

The bins need not be of the form specifically described herein. Differently shaped bins could be used. Also, the bins may be structurally different. In another embodiment the bins could be constructed from a framework of wood studs covered with drywall. Further, the bins need not discharge onto a belt conveyor as shown. In another example, the bins could discharge into, say, a screw conveyor, or even directly into an incinerator or other garbage handling equipment.

Although the description refers to apparatus handling garbage in bags, there is no limitation in this respect. The garbage could be loose, provided it is relatively dry and otherwise suitable for handling in the manner described. The apparatus could also be used for handling material of appropriate form other than garbage, e.g. laundry.

It should also be noted that the form of lifting arrangement provided for the platforms of the bins and the platforms themselves may be varied. In an alternative embodiment, overhead lifting devices such as chains or cable lifts, hoists or the like could be provided for lifting the platforms from above. A still further possibility would be to provide a rack and pinion type of lifting arrangement.

What we claim is:

1. Material handling apparatus comprising a series of material receiving bins, each comprising: substantially rigid front, rear and side walls arranged in generally upright positions and defining a generally upright space which is of uniform rectangular cross-sectional shape throughout its height and which has an open upper end through which material can be introduced into the bin; a substantially rigid platform of a rectangular shape dimensioned to fit closely within said walls of the bin, said platform forming a bottom wall of the bin and being movable with respect to said front, rear and side walls between a bottom position when the bin is empty and an upper position for ejecting material from the bin; and means for moving the platform between its said positions; the bins being disposed closely adjacent one another in a cascade arrangement in which the bins are of progressively increasing height with increasing distance from a discharge location so that material ejected from an upper bin in said series will tend to pass into an adjacent lower bin, and each of said platforms having a flat upper surface which is inclined with respect to the front and rear walls of the associated bin so as to slope towards said discharge location when the platform is in its upper position and form a closed top on the bin over which material ejected from a higher bin in said series can pass towards said discharge location, the platforms of all of the bins being arranged to co-operate when in their upper positions to form a generally flat inclined surface sloping towards said discharge location.

2. Apparatus as claimed in claim 1, wherein said means for moving the platform of each bin between its upper and lower positions comprise a hydraulic cylinder and ram device disposed below and coupled to said platform so that the platform can be moved between its said positions by extending and retracting the ram of said device.

3. Apparatus as claimed in claim 1, wherein said front and rear walls of the bins are inclined towards said discharge location of the apparatus so as to promote movement of material ejected from the bins in that direction.

4. Apparatus as claimed in claim 1, wherein each of said platforms comprises a flat top sheet which forms said upper suface of the platform, a framework supporting said sheet, and a plurality of rollers rotatably supported by and projecting outwardly from said framework for rolling engagement with the inner surfaces of at least said front and rear walls of the bin.

5. Apparatus as claimed in claim 4, wherein each said platform has a rear edge adjacent said rear wall of the bin and a front edge adjacent said front wall, and wherein the platform is designed so that, in its said upper position, its rear edge is disposed at a position below the upper edge of the rear wall of the bin and its front edge is disposed at a position above the upper edge of the front wall of the bin.

6. Apparatus as claimed in claim 1, further comprising a belt conveyor disposed at said discharge location and positioned to receive material discharged from said bins for conveying discharged material to a location remote from said bins.

7. Apparatus as claimed in claim 6, comprising two similar series of bins disposed on respectively opposite sides of said belt conveyor and arranged so that material can be selectively discharged from the bins of either or both of said series onto said conveyor.

8. The combination of: apparatus as claimed in claim 6 or 7 for handling garbage in bags, and an incinerator for burning said garbage, wherein the incinerator includes means for feeding bags of garbage into the incinerator, said feeding means being disposed adjacent said belt conveyor for receiving material from said bins.

* * * * *